(12) United States Patent
Ichimura et al.

(10) Patent No.: US 7,437,533 B2
(45) Date of Patent: Oct. 14, 2008

(54) QUANTUM INFORMATION PROCESSING DEVICE AND METHOD

(75) Inventors: Kouichi Ichimura, Yokohama (JP); Hayato Goto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 125 days.

(21) Appl. No.: 11/535,263

(22) Filed: Sep. 26, 2006

(65) Prior Publication Data

US 2007/0145348 A1 Jun. 28, 2007

(30) Foreign Application Priority Data

Dec. 27, 2005 (JP) ............................. 2005-376497

(51) Int. Cl.
*G06F 15/00* (2006.01)
*G01J 11/00* (2006.01)
*G03H 5/00* (2006.01)

(52) U.S. Cl. ..................... 712/1; 712/220; 250/526; 359/1; 359/896

(58) Field of Classification Search ............. 712/1, 712/220; 250/526; 359/1, 896
See application file for complete search history.

(56) References Cited

U.S. PATENT DOCUMENTS 6,800,837 B1 10/2004 Ichimura et al.
2005/0110106 A1 5/2005 Goto et al.

FOREIGN PATENT DOCUMENTS

WO WO 2004106961 A1 * 12/2004

OTHER PUBLICATIONS

K. Ichimura, et al., "Evidence for electromagnetically induced transparency in a solid medium", The American Physical Society, Physical Review A, vol. 58, No. 5, Nov. 1998. pp. 4116-4120.

Kouichi Ichimura, "A simple frequency-domain quantum computer with ions in a crystal coupled to a cavity mode", Optics Communications 196, Sep. 1, 2001, pp. 119-125.

E. Fraval, et al., "Method of Extending Hyperfine Coherence Times in Pr3+:Y2SiO5", The American Physical Society, Physical Review Letters, vol. 92, No. 7, Feb. 20, 2004, pp. 077601-1-077601-4.

E. Fraval, et al., "Dynamic Decoherence Control of a Solid-State Nuclear-Quadrupole Qubit", The American Physcial Society, Physical Review Letters 95, Jul. 15, 2005, pp. 030506-1-030506-4.

Hayato Goto, et al., "Multiqubit controlled unitary gate by adiabatic passage with a optical cavity", The American Physical Society, Physical Review A 70, Jul. 9, 2004, pp. 012305-1-012305-8.

U.S. Appl. No. 10/975,445, filed Oct. 29, 2004, Goto et al.
U.S. Appl. No. 11/535,263, filed Sep. 26, 2006, Ichimura et al.

* cited by examiner

*Primary Examiner*—Evan Pert
(74) *Attorney, Agent, or Firm*—Oblon, Spivak, McClelland, Maier & Neustadt, P.C.

(57) ABSTRACT

Quantum information processing device includes resonator incorporating material containing physical systems, each of physical systems having at least four energy states, transition between two energy states of at least four energy states, and transition energy between at least two energy states of at least four energy states, at least four energy states being non-degenerate when magnetic field fails to be applied to physical systems, transition resonating in resonator mode that is in common between physical systems, each of at least four energy states representing a quantum bit, transition energy being shifted when magnetic field is applied to physical systems, and magnetic-field application unit configured to apply magnetic field having direction and intensity to material, to eliminate linear transition energy shift between two energy states included in physical systems, each of two energy states included in physical systems being with excluding two energy states resonating in resonator mode.

16 Claims, 6 Drawing Sheets

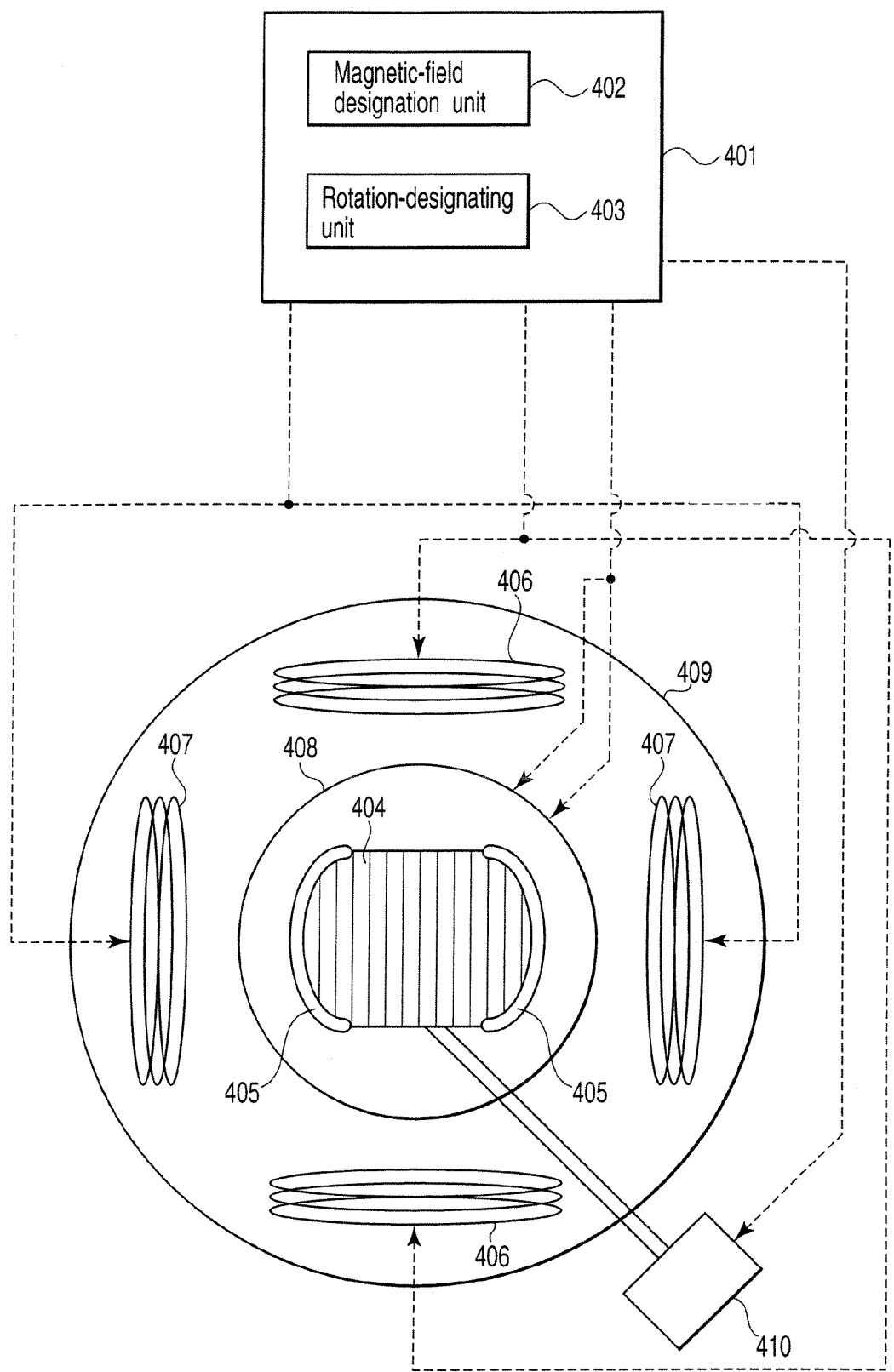
F I G. 4

QUANTUM INFORMATION PROCESSING DEVICE AND METHOD

CROSS-REFERENCE TO RELATED APPLICATIONS

This application is based upon and claims the benefit of priority from prior Japanese Patent Application No. 2005-376497, filed Dec. 27, 2005, the entire contents of which are incorporated herein by reference.

BACKGROUND OF THE INVENTION

1. Field of the Invention

The present invention relates to a quantum information processing method involving a magnetic-field application method for a physical system, in which coherence time is extended by the magnetic field applied to the system, to effectively utilize the extended coherence time in a quantum information processing device that uses a resonator mode. It also relates to a quantum information processing device capable of effectively utilizing the coherence time.

2. Description of the Related Art

In quantum information processing devices such as quantum computers, information (quantum bit information) is represented by superposed states related to a certain physical state of a physical system, such as an atom, ion or photon. In this case, information processing is realized by iterating, for example, individual operations of quantum bits, or conditional gate operations in which interaction between a pair of physical systems is introduced so that a change in a quantum bit corresponding to one of the physical systems will cause a change in a quantum bit corresponding to the other physical system.

It is necessary for each physical system to hold the coherency of its physical quantity during information processing. Accordingly, physical systems with a long coherence time are required. Coherence time means the time until coherence is lost, and hence is also called de-coherence time. The coherence time of the hyperfine structure level of rare-earth ions dispersed in an oxide crystal is exceptionally long for a solid, and can be controlled using electromagnetic radiation of near visible-light frequencies. This being so, rare-earth ions are highly promising as physical systems that enable a quantum information processing device to be constructed using a solid material (see, for example, K. Ichimura, K. Yamamoto and N. Gemma, Phys. Rev. A 58(5], 4116(1998); and K. Ichimura, Opt. Common. 196, 119(2001)).

Further, a dominant method for extending the coherence time of the hyperfine structure level of crystalline rare-earth ions has recently been proposed (see, for example, E. Fraval, M. J. Sellars, and J. J. Longdell, Phys. Rev. Lett. 92(7), 077601(2004)). It has been confirmed experimentally that this method can achieve a remarkable increase in coherence time. However, in general, the de-coherence that can be considerably suppressed at a time is only that between a pair of energy states.

When using crystalline rare-earth ions in a quantum information processing device, the use of a resonator mode is almost indispensable at present. However, in the case of using the resonator mode, no specific magnetic-field application methods are known, which clarify, for example, between which energy states de-coherence should be suppressed, or when a magnetic field should be applied, in order to actually utilize the effect of suppression of de-coherence by magnetic-field application in the quantum information processing device.

BRIEF SUMMARY OF THE INVENTION

In accordance with a first aspect of the invention, there is provided a quantum information processing device comprising: a resonator incorporating a material containing a plurality of physical systems, each of the physical systems having at least four energy states, transition between two energy states of the at least four energy states, and transition energy between at least two energy states of the at least four energy states, the at least four energy states being non-degenerate when a magnetic field fails to be applied to the physical systems, the transition resonating in resonator mode that is in common between the physical systems, each of the at least four energy states representing a quantum bit, the transition energy being shifted when the magnetic field is applied to the physical systems; and a magnetic-field application unit configured to apply a magnetic field having a direction and an intensity to the material, to eliminate a linear transition energy shift between two energy states included in the physical systems, each of the two energy states included in the physical systems being with excluding the two energy states resonating in the resonator mode.

In accordance with a second aspect of the invention, there is provided a quantum information processing device comprising: a resonator incorporating a material containing a plurality of physical systems, each of the physical systems having a plurality of energy states and transition between two energy states of the plurality of energy states, the transition resonating in the resonator mode that is in common between the physical systems, each of energy states that are degenerate and are included in the plurality of energy states representing a quantum bit; a magnetic-field application unit configured to apply a magnetic field to the physical systems; a light source unit configured to output a laser beam; a separation unit configured to separate the laser beam into a plurality of laser beams; a laser control unit configured to control phase, intensity and frequency of each of the laser beams, the laser control unit converting the laser beams into pulse laser beams; an emission unit configured to emit the controlled laser beams to the physical systems; and a magnetic-field control unit configured to control application of the magnetic field, the magnetic-field control unit causing the magnetic-field application unit to interrupt the application of the magnetic field only when adiabatic passage for a two-qbit (i.e., quantum bit) gate operation is performed between two of the physical systems utilizing the resonator mode.

BRIEF DESCRIPTION OF THE SEVERAL VIEWS OF THE DRAWING

FIG. 4 is a block diagram illustrating part of a quantum information processing device according to a first embodiment, in which energy states are set to the critical point where quantum bits are represented by energy states that are not degenerated when no magnetic field is applied;

DETAILED DESCRIPTION OF THE INVENTION

Figure 1:
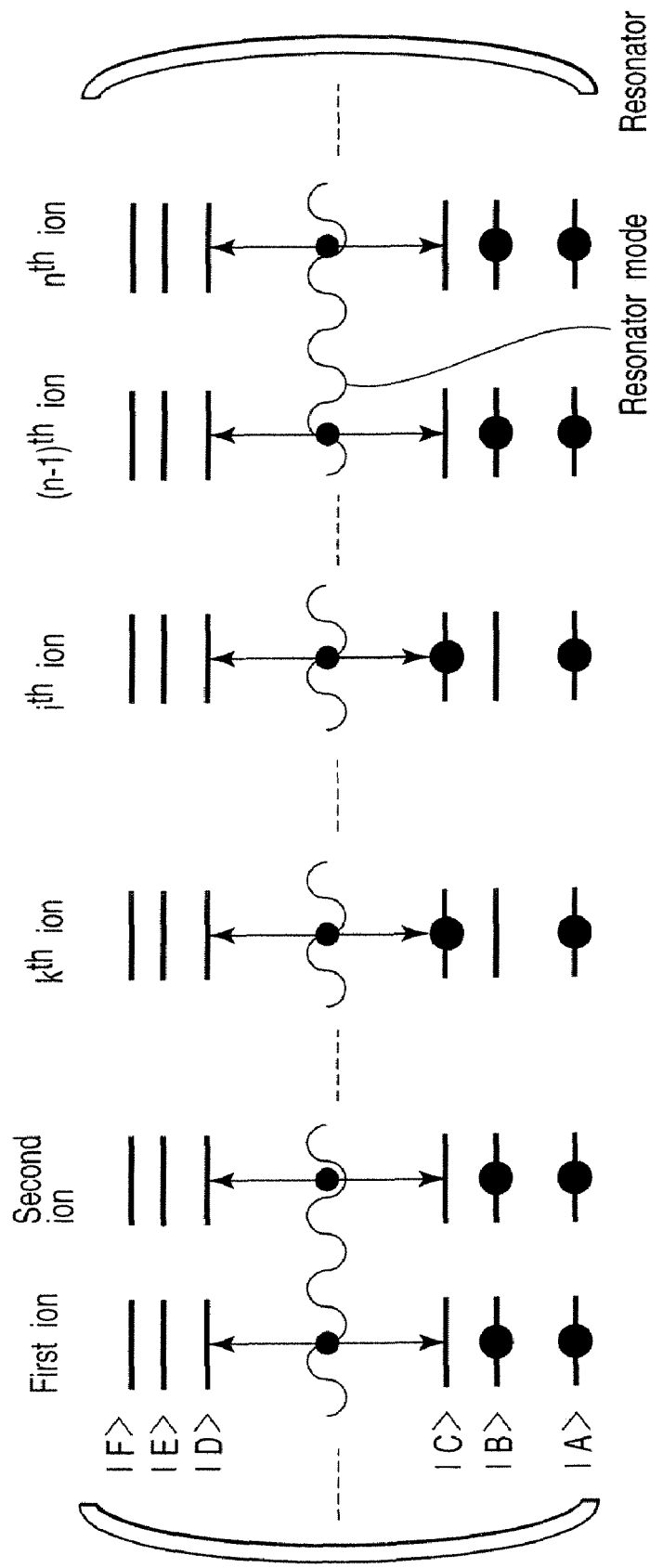
FIG. 1 is a view illustrating the relationship between a common resonator mode and a plurality of ion energy states indicating a plurality of quantum bits.

Quantum information processing devices and methods according to embodiments of the invention will be described in detail with reference to the accompanying drawings.

In the quantum information processing devices and methods utilizing a common resonator mode, according to embodiments of the invention, the significantly extended coherence time of quantum bits can be actually used for quantum information processing.

Firstly, a description will be given of the essential matter of the quantum information processing devices and methods of the embodiments. In the embodiments described below, energy states are set to the critical point, described later, by applying a magnetic field thereto. The resultant energy states in which the coherence time is significantly extended are assumed to be those that contain no energy states resonating in the resonator mode and stores quantum information for a long time. The quantum information processing devices and methods of the embodiments effectively utilize the long coherence time acquired by the application of the magnetic field, thereby increasing the maximum number of executable steps (the number of executions of a series of quantum operations), or the number of such steps and quantum bits. Namely, the embodiments of the invention can increase the processing capacity based on quantum computation.

Further, in the quantum information processing devices and methods of the embodiments, when no external magnetic field is applied and quantum information is represented by degenerated energy states, if a constant magnetic field is continuously applied except during the execution of the adiabatic passage method in a two-qbit gate operation that utilizes degeneration, quantum information processing, in which the maximum number of executable steps, or the number of both such steps and quantum bits is increased, can be realized.

Before giving a detailed description of the quantum information processing devices and methods according to the embodiments of the invention, the mechanism will be described which enables the coherence time to be extended in a manner effective to quantum information processing, and enables the number of steps, or the number of steps and quantum bits to be significantly increased.

The embodiments of the invention utilize the above-mentioned method proposed by Fraval et al. (E. Fraval, W. J. Sellars, and J. J. Longdell, Phys. Rev. Lett. 92(7), 077601 (2004)) for suppressing, by the application of a magnetic field, the de-coherence between the states of the nuclear spin of each of rare-earth ions dispersed in a material (e.g., crystal). When the rare-earth ions dispersed in the crystal are cooled down to the temperature of liquid helium, the factor that causes the states of the nuclear spin of each rare-earth ion to lose coherence is the fluctuation in the intensity of the magnetic field generated at each ion, which is caused by fluctuation in the state of the nuclear spin of each atom and ion of the crystal. In the method of Fraval et al., a magnetic field of a direction and intensity unique to certain two energy states of the nuclear spin of each of the dispersed rare-earth ions is applied to the two energy states, so that a linear shift (first order Zeeman shift) in transition energy between the two energy states with respect to the magnetic field will disappear or become extremely small. In this state, the certain two energy states are represented to be at the three-dimensional critical point. When such a magnetic field as the above is applied, the de-coherence between the two energy states is suppressed.

Fraval et al. detected that when a magnetic field of (x, y, z)=(732, 173, −219)G, which sets, to the critical point, the states $m_I=+\frac{1}{2} \Leftrightarrow +\frac{3}{2}$ of the nuclear spin of $Pr^{3+}:Y_2SiO_5$ that assumes the electronic ground state, the coherence time is extended to 82 ms from a maximum value of about 500 μs measured till that time. The $C_2$-axis of the crystal is the y-axis, and the polarization direction of the optical transition between $^3H_4$ and $^1D_2$ is the z-axis.

At the critical point, the attenuation of a Raman heterodyne spin echo signal indicating de-coherence is represented not by a simple exponential function but by $I=I_0 \exp\{-(2t/T_M)^2\}$, and 82 ms indicating a coherence time corresponds to $T_M$ (phase memory time) in the equation. Further, in the equation, I is the intensity of the Raman heterodyne spin echo signal, $I_0$ is the initial intensity of the Raman heterodyne spin echo signal, and t is the time. The factor that causes de-coherence under these conditions is already analyzed, and the coherence time can be further extended if a pulse stream is applied (E. Fraval, W. J. Sellars, and J. J. Longdell, Phys. Rev. Lett. 95, 030506(2005)). They also detected that if a magnetic field of about 30 G is applied, the coherence time between degenerated energy states is remarkably extended ($m_I=+\frac{1}{2} \Leftrightarrow -\frac{1}{2}$, 5.86 ms).

Concerning the increase in coherence time by the application of a magnetic field, the following features are acquired:

(1) In general, the de-coherence that can be significantly suppressed by the setting to the critical point is only that between a pair of energy states which are not degenerated when no magnetic field is applied; and (2) The coherence time between energy states that are degenerated when no magnetic field is applied is extended by the application of a magnetic field.

When crystal with rare-earth ions dispersed therein is utilized in a quantum information processing device, it is practical to utilize a resonator mode and interaction between quantum bits, as is symbolically shown in FIG. 1. The resonator mode is so-called "invisible wiring". Since it is difficult to accurately position ions adjacent to each other to cause them interact with each other, it is simple and reliable to utilize the resonator mode.

The resonator mode is utilized to perform conditional gate operations between two physical systems that provide quantum bits. The physical systems are operated so that different energy states in the systems sequentially represent various quantum bits in accordance with various operations or states, such as individual operations of quantum bits (using a one-quantum-bit gate), conditional gate operations between two quantum bits, or no operations for maintaining the energy states as they are. To perform such operations as the above on each ion, ions that have different transition energies between their energy states are used as quantum bits (FIG. 1 does not show the differences in transition energies between ions), and the frequency of light to be applied is adjusted to that of each ion to be operated.

In the examples of FIG. 1, concerning the ions (i.e., $1^{st}$ to $(k-1)^{th}$, $(k+1)^{th}$ to $(l-1)^{th}$ and $(l+1)^{th}$ to $n^{th}$ ions), which are not yet subjected to a gate operation, quantum bits realized by them are represented by, for example, |A> and |B>. Further, only for the ions ($k^{th}$ and $l^{th}$ ions) subjected to a two-qbit gate operation, |C> is temporarily used to represent quantum bits. However, quantum information is not necessarily shifted to |C> in both the $k^{th}$ and $l^{th}$ ions or simultaneously in both the $k^{th}$ and $l^{th}$ ions.

When information processing using quantum bits is performed as described above, it is difficult to simultaneously set, to the critical point, the energy states of physical systems that represent different quantum bits, for the following reasons:

Firstly, when a quantum information processing device that processes quantum bits is operating, different physical systems assume different states that represent different quantum bits, therefore it is necessary to apply magnetic fields of different directions and intensities in accordance with the states of the physical systems, which is not practical.

Secondly, there is a case where two or more quantum bits are represented by a single physical system (e.g., a single ion). In this case, the energy states representing different quantum bits cannot simultaneously be set to the critical point.

In light of the above, it is practical to simultaneously apply a magnetic field of a certain intensity and direction to all physical systems. As the two energy states to be set to the critical point by the magnetic field to thereby remarkably extend the coherence time, it is effective to select the two energy states that can hold quantum bits for the longest time, i.e., to select the two energy states that can represent quantum bits for the longest time during information processing.

As will be described later in the first embodiment of the invention, the energy states that do not resonate in the resonator mode, e.g., |A> and |B>, can represent quantum bits for a longer time. When a two-qbit gate operation is required between two target quantum bits in two physical systems, the energy states that resonate in the resonator mode are used only to represent the target quantum bits, thereby executing the two-qbit gate operation based on the resonator mode. The other quantum bits are maintained represented by the energy states that do not resonate in the resonator mode, so as not to be influenced by the two-qbit gate operation performed between the above-mentioned quantum bits. After executing the two-qbit gate operation, even the two target quantum bits subjected to the two-qbit gate operation are returned to the energy states that do not resonate in the resonator mode.

Figure 2:
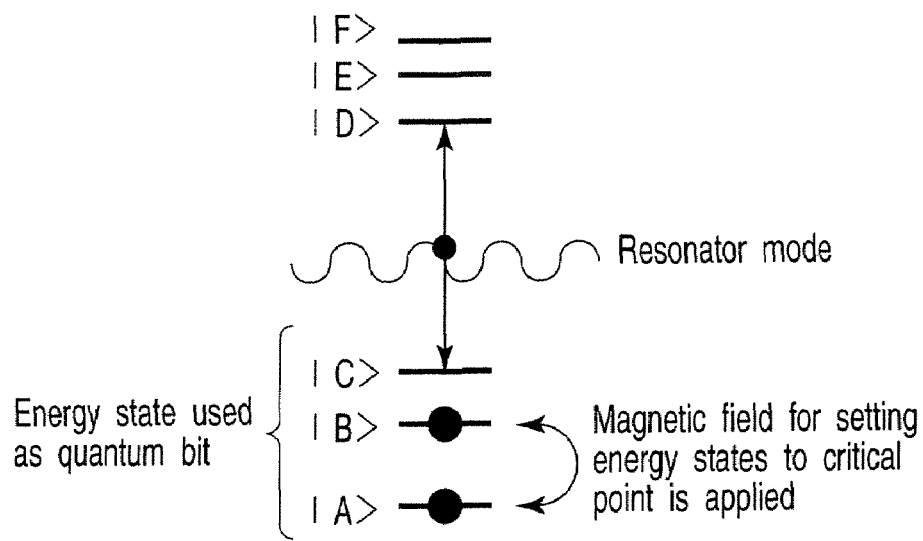
FIG. 2 is a view illustrating the relationship, employed in quantum information processing devices and methods according to embodiments, between energy states set to the critical point and a resonator mode, where quantum bits are represented by energy states that are not degenerated when no magnetic field is applied.

In the embodiments of the invention, in the case of quantum information processing in which the energy states that are not degenerated when no magnetic field is applied represent quantum bits (see, for example, H. Goto and K. Ichimura, Phys. Rev. A 70(1), 012305(2004)), two energy states, which need to hold quantum bits for a long time and contain no energy state that resonate in the resonator mode, are set to the critical point (corresponding to the above-mentioned feature (1)), thereby enabling the effective use of the remarkably extended coherence time (FIG. 2).

Figure 3:
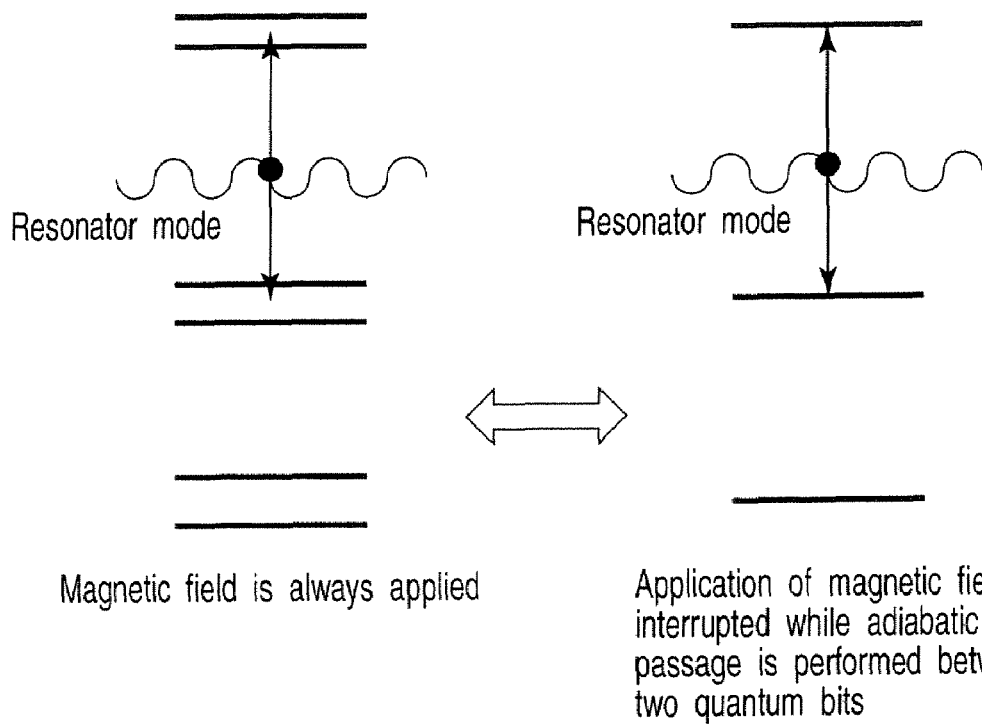
FIG. 3 is a view illustrating the relationship between the time of applying a magnetic field, the energy state and the resonator mode, assumed, in the quantum information processing devices and methods of the embodiments, where quantum bits are represented by degenerated energy states when no magnetic field is applied.

In the case of quantum information processing in which quantum bits are represented by two degenerated energy states, these degenerated energy states cannot be set to the critical point. However, if a magnetic field is applied to the degenerated energy states, they are returned to non-degenerated energy states and hence the coherence time is extended (corresponding to the above-mentioned feature (2)). Accordingly, it is desirable to continue the application of a magnetic field if the quantum bits need to be held. The intensity of the magnetic field is determined from the type of crystal, and the energy level of degeneration. However, in the known two-qbit gate operation utilizing the resonator mode (see, for example, K. Ichimura, Opt. Column. 196, 119(2001)), it is necessary to interrupt the application of a magnetic field when the adiabatic passage method is used between two physical systems that represent two target quantum bits. This is because the adiabatic passage method utilizes degenerated energy states. Accordingly, a magnetic-field applying method is useful, in which a magnetic field is applied in a steady state, and the application of the magnetic field is interrupted only when using the adiabatic passage method for the two-qbit gate operation (FIG. 3).

As described above, in the quantum information processing devices utilizing the resonator mode, according to the embodiments of the invention, when the coherence time is extended by the application of a magnetic field, the extended coherence time can be effectively utilized for quantum information processing if the energy states which should be set to the critical point and the time when the states are set to the critical point, are appropriately selected.

First Embodiment

Referring to FIG. 4, a description will be given of a quantum information processing device and method according to a first embodiment.

The first embodiment is directed to an example corresponding to the above-described feature (1) "In general, the de-coherence that can be significantly suppressed by the setting to the critical point is only that between a pair of energy states which are not degenerated when no magnetic field is applied."

As shown in FIG. 4, the quantum information processing device of the first embodiment comprises a controller 401, rare-earth dispersed crystal 404, resonator 405, coils 406 to 408, cryostat 409 and rotation unit 410. The controller 401 includes a magnetic-field designation unit 402 and rotation-designating unit 403.

The controller 401 controls the direction and intensity of the magnetic field applied to the rare-earth dispersed crystal 404. The magnetic-field designation unit 402 adjusts the levels of the current to be supplied to the coils 406 to 408, thereby adjusting the direction and intensity of the resultant magnetic field. The rotation unit 410 three-dimensionally rotates the rare-earth dispersed crystal 404. Namely, the rotation unit 410 can rotate the rare-earth dispersed crystal 404 about each of the three axes that are not parallel to each other. The rotation unit 410 can control the direction of the magnetic field applied to the rare-earth dispersed crystal 404.

Although FIG. 4 shows the coils 406 to 408 and rotation unit 410, only the coils 406 to 408 can control the direction and intensity of the magnetic field applied to the rare-earth dispersed crystal 404. Further, even a combination of the rotation unit 410 and any one of the coils 406 to 408 can control the direction and intensity of the magnetic field applied to the rare-earth dispersed crystal 404. The coils 406 to 408 are, for example, electromagnets or superconducting magnets.

The rare-earth dispersed crystal 404 is crystal with rare earth ions dispersed therein, and the nuclear spin of each rare earth ion forms superposed states. The rare-earth dispersed crystal 404 is a solid material succeeded in realization of electromagnetically induced transparency (EIT). The material that has realized EIT can hold quantum mechanically superposed states for an especially long time for a solid, and the quantum states can be operated and observed using light. EIT is a phenomenon that drastically changes the optical properties. EIT causes superposed states in which no light absorption is performed, and no atoms or ions are excited into a higher energy state. The material that realizes solid EIT is, for example, crystal ($Pr^{3+}:Y_2SiO_5$) containing rare-earth ions, and a level system including the hyperfine structure levels of the ions is used.

The rare-earth dispersed crystal 404 is oxide crystal containing rare earth ions. The first embodiment employs crystal of $Pr^{3+}:Y_2SiO_5$ in which 0.01% $y^{3+}$ ions are replaced with $Pr^{3+}$ ions. The physical systems representing quantum bits are $Pr^{3+}$ ions contained in $Pr^{3+}:Y_2SiO_5$ crystal. The rare-earth dispersed crystal 404 has a size of about 1 mm×1 mm×1 mm, and a mirror of an ultrahigh reflectance is formed on its surface, thereby providing a resonator structure.

The resonator 405 has a resonator mode. The resonator mode is made to resonate with the transition between $^3H_4$ and $^1D_2$ concerning $Pr^{3+}$ ions.

The coils 406 to 408 are provided around the crystal, as shown in FIG. 4, for applying a magnetic field of a preset direction and intensity to the crystal. In FIG. 4, the coils 406 and 407 are arranged around the rare-earth dispersed crystal 404, and a pair of coils 408 are arranged with a certain plane interposed between a pair of coils 408, the certain plane including the centers of the coils 406 and 407.

The cryostat 409 maintains its internal temperature at 1.5 K.

Figure 5:
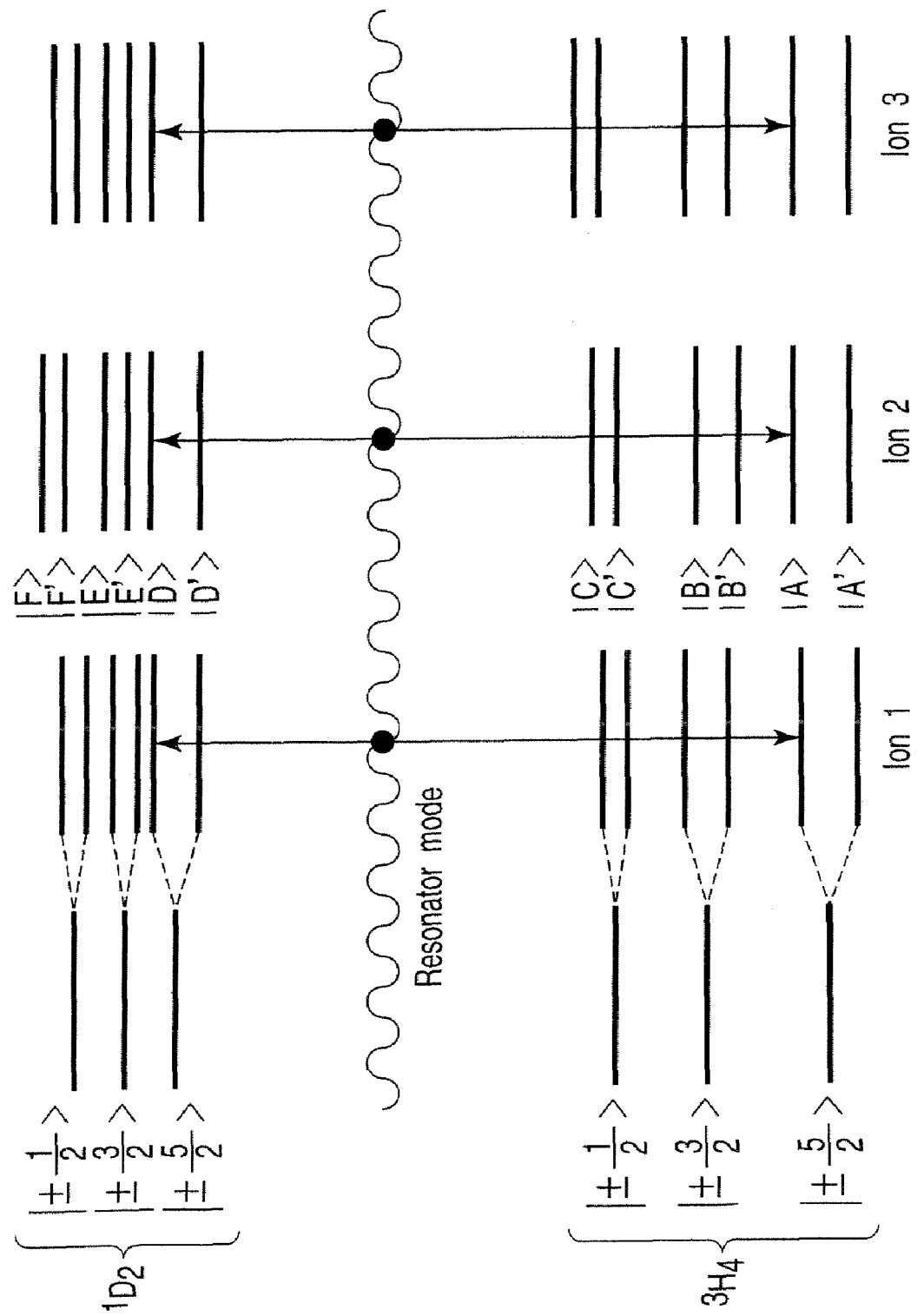
FIG. 5 is a view illustrating the energy states of three $Pr^{3+}$ ions employed in the first embodiment.

Referring to FIG. 5, a description will now be given of the suppression of de-coherence between two energy states that occurs when a magnetic field is applied to the rare-earth dispersed crystal 404. FIG. 5 shows the energy states of three $Pr^{3+}$ ions utilized in the first embodiment when a magnetic field is applied.

In the case of FIG. 5, the coils 406 to 408 apply a magnetic field to the rare-earth dispersed crystal 404 so that two energy states of a certain ion, i.e., $|\pm\frac{1}{2}\rangle$ and $|\pm\frac{3}{2}\rangle$ (=electronic ground states $^3H_4$), will be set to the critical point. Specifically, the coils 406, 407 and 408 apply magnetic fields of 173 G, −219 G and 732 G to the $C_2$-axis direction of the crystal, the polarization direction of the optical transition between $^3H_4$ and $^1D_2$, and a direction perpendicular to these two directions (i.e., the $C_2$-axis direction and the polarization direction), respectively. The direction and intensity of each magnetic field are unique to the transition energy between the corresponding two energy states representing quantum bits, and offset the linear transition energy shift.

As shown in FIG. 5, the states generated by hyperfine structure splitting from electronic ground state $^3H_4$ and electronic excited state $^1D_2$ are further split by the application of a magnetic field. The states used in the first embodiment are |A'>, |A>, |B'>, |B>, |C'>, |C>, |D'>, |D>, |E'>, |E>, |F'> and |F> in the increasing order of energy. The first embodiment utilizes three ions, in each of which all transitions between |A> and |D> resonates in the common resonator mode.

Firstly, |A'>, |A>, |B'>, |B>, |C'>, |C>, |D'>, |D>, |E'>, |E>, |F'> and |F> will now be referred to as |2'>, |2>, |0'>, |0>, |1'>, |1>, |3'>, |3>, |4'>, |4>, |5'> and |5>, respectively. As shown, the transition energy between any two of the 12 energy states varies in a certain energy range, except for between any two of the four energy states |2'>, |2>, |3'> and |3>. In this case, ions having different transition frequencies are utilized, and resonant ions can be selected by adjusting the frequency of the light applied.

Figure 6:
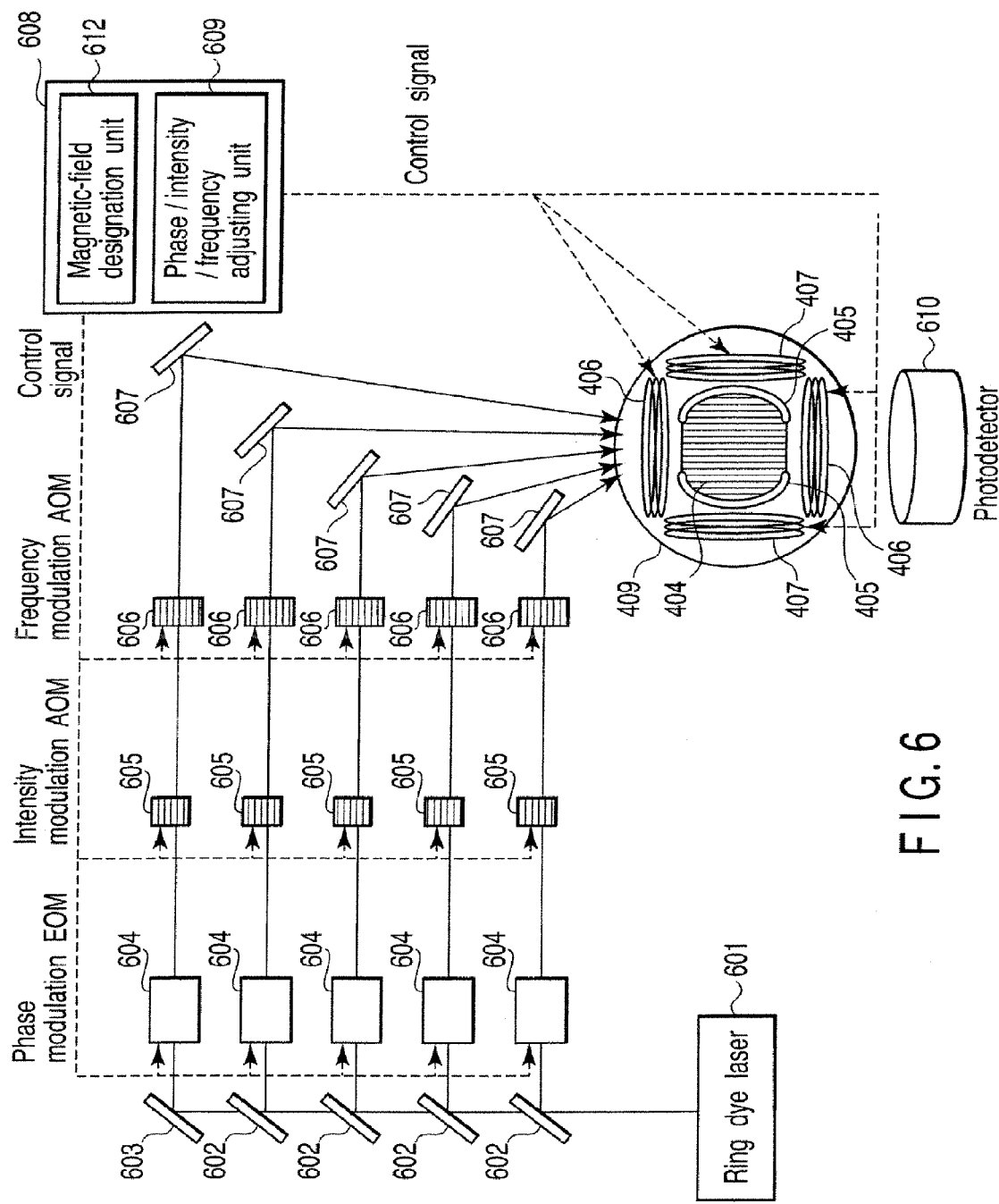
FIG. 6 is a view illustrating the entire quantum information processing device used for performing a gate operation in the first or second embodiment.

A description will be given of a gate operation performed on the states of coherence acquired in the above. For the gate operation, it is necessary to emit light to the rare-earth dispersed crystal 404. Referring to FIG. 6, the quantum information processing device of the first embodiment, which incorporates a unit used for the gate operation, will be firstly described.

The quantum information processing device of FIG. 6 comprises, as well as the elements of the device shown in FIG. 4, a ring dye laser 601, four beam splitters 602, mirror 603, phase modulating EO modulators (EOMs) 604, intensity-modulating AO modulators (AOMs) 605, frequency-modulating AOMs 606, five mirrors 607, controller 608 and photodetector 610. The controller 608 includes a magnetic-field designation unit 612 and phase/intensity/frequency adjusting unit 609. In the following description, elements similar to the above-described ones will be denoted by the corresponding reference numbers, and duplication of explanation will be avoided. In FIG. 6, only two pairs of coils are provided, and the rotation-designating unit 403 is not employed. Alternatively, the quantum information processing device of FIG. 6 may employ a pair of coils and the rotation-designating unit 403, or may employ only three pairs of coils.

The ring dye laser 601 serves as a light source unit for generating light. The ring dye laser 601 includes a feedback system for suppressing frequency jitters, and generates a laser beam with a low frequency of several kHz.

The beam splitter 602 receives light from the ring dye laser 601, and splits the received light in transmission light and reflected light. In the example of FIG. 6, the four beam splitters 602 split the light from the ring dye laser 601 into five light beams. The mirror 603 receives and reflects the light passing through the last one (i.e., the uppermost one in FIG. 6) of the beam splitters 602.

The phase modulating EOMs 604 receive the light beams from the respective beam splitters 602 and mirror 603, and modulate the phases of the light beams. The intensity-modulating AOMs 605 receive light beams from the respective phase modulating EOMs 604, and modulate the intensity of the light beams. The frequency-modulating AOMs 606 receive the light beams from the respective intensity-modulating AOMs 605, and modulate the frequencies of the light beams.

The mirrors 607 reflect the light beams from the respective frequency-modulating AOMs 606. The mirrors 607 are adjusted to guide the light beams to the rare-earth dispersed crystal 404.

The photodetector 610 incorporates a light converging system of a high efficiency, and detects, with high sensitivity and high efficiently, the photons generated by ions in the rare-earth dispersed crystal 404 when light is applied to the crystal.

The controller 608 controls the current flowing through the coils 406 and 407 for generating a magnetic field applied to the rare-earth dispersed crystal 404, and controls the phase modulating EOMs 604, intensity-modulating AOMs 605 and frequency-modulating AOMs 606. The phase/intensity/frequency adjusting unit 609 determines the values to which the respective phase modulating EOMs 604 modulate the phases of the light beams to thereby adjust the phase modulating EOMs 604, determines the values to which the intensity-modulating AOMs 605 modulate the intensity of the respective light beams, and determines the values to which the frequency-modulating AOMs 606 modulates the frequencies of the respective light beams.

Referring to FIG. 5, the gate operation will be described.

Firstly, five light beams are sequentially applied to ion 1, ion 2, and ion 3, and each of five light beams simultaneously is applied the ion 1, ion 2, and ion 3, using the apparatus of FIG. 6, thereby initializing the state of each of the ions to |0> or |1>. To initialize, for example, ion 1 to |0>, light beams that resonate with the transition between |2'> and |4'>, between |2> and |4>, between |0'> and |3'>, between |1> and |5'> and between $|1\rangle$ and $|5\rangle$ are simultaneously applied to the rare-earth dispersed crystal 404. Thus, ions 1, 2 and 3 are firstly initialized to $|0\rangle$.

Subsequently, adiabatic passage is performed between the transition between $|2\rangle_3$ and $|4\rangle_3$ and the combination of the transition between $|0\rangle_3$ and $|4\rangle_3$ and the transition between $|1\rangle_3$ and $|4\rangle_3$, using Gaussian pulse light with a pulse width of 10 µs that resonates with the transition between $|2\rangle_3$ and $|4\rangle_3$, the transition between $|0\rangle_3$ and $|4\rangle_3$ and the transition between $|1\rangle_3$ and $|4\rangle_3$ (firstly, Gaussian pulse light that resonates with the transition between $|2\rangle_3$ and $|4\rangle_3$ is applied). The subscript of each energy state (i.e., k of $|j\rangle_k$ (j=0, 1, 2, 3, 4, 5; k=1, 2, 3)) is the number that indicates which one of ions 1, 2 and 3 each energy state belongs to. The Gaussian pulse light with the pulse width of 10 µs is generated by the intensity-modulating AOMs 605.

Subsequently, adiabatic passage is performed between the combination of two transitions, i.e., the transition between $|0\rangle_3$ and $|3\rangle_3$ and the transition between $|1\rangle_3$ and $|3\rangle_3$, and the combination of four transitions, i.e., the transition between $|0\rangle_1$ and $|3\rangle_1$, the transition between $|1\rangle_1$ and $|3\rangle_1$, the transition between $|0\rangle_2$ and $|3\rangle_2$, and the transition between $|1\rangle_3$ and $|3\rangle_3$, using Gaussian pulse light with a pulse width of 10 µs that resonates with each of the transitions. More specifically, this adiabatic passage is performed by applying the light twice (i.e., by applying the light firstly to the former combination, and secondly to the latter combination, the phase of the secondly applied light being inverted).

Lastly, adiabatic passage inverse of the first case is performed between the transition between $|2\rangle_3$ and $|4\rangle_3$ and the combination of the transition between $|0\rangle_3$ and $|4\rangle_3$ and the transition between $|1\rangle_4$ and $|3\rangle_4$ (in this adiabatic passage, light is applied firstly to the combination).

If the quantum bits are $|0\rangle$ and $|1\rangle$, a series of gate operations mentioned above is regarded as a quantum Toffoli gate operation for changing the quantum states as follows:

$$(|0\rangle_1, |0\rangle_2, |0\rangle_3) \rightarrow (|0\rangle_1, |0\rangle_2, |0\rangle_3)$$

$$(|0\rangle_1, |1\rangle_2, |0\rangle_3) \rightarrow (|0\rangle_1, |1\rangle_2, |0\rangle_3)$$

$$(|1\rangle_1, |0\rangle_2, |0\rangle_3) \rightarrow (|1\rangle_1, |0\rangle_2, |0\rangle_3)$$

$$(|1\rangle_1, |1\rangle_2, |0\rangle_3) \rightarrow (|1\rangle_1, |1\rangle_2, |1\rangle_3)$$

If ions 1, 2 and 3 are initialized to $(|0\rangle_1, |0\rangle_2, |0\rangle_3)$, the above-described quantum Toffoli gate operation is iterated three times at intervals of 10 ms, and the final results are read by light application and photon detection, $(|0\rangle_1, |0\rangle_2, |0\rangle_3)$ are acquired as the final results. Similarly, if ions 1, 2 and 3 are initialized to $(|0\rangle_1, |1\rangle_2, |0\rangle_3)$, $(|1\rangle_1, |0\rangle_2, |0\rangle_3)$, and $(|1\rangle_1, |1\rangle_2, |0\rangle_3)$, and the quantum Toffoli gate operation is iterated three times for the respective initialization cases, $(|0\rangle_1, |1\rangle_2, |0\rangle_3)$ $(|1\rangle_1, |0\rangle_2, |0\rangle_3)$ and $(|1\rangle_1, |1\rangle_2, |1\rangle_3)$ are acquired as the final results.

If the sequence consisting of three successive quantum Toffoli gate operations is iterated a large number of times, and the final results are read, $(|0\rangle_1, |0\rangle_2, |0\rangle_3)$, $(|0\rangle_1, |1\rangle_2, |0\rangle_3)$, $(|1\rangle_1, |0\rangle_2, |0\rangle_3)$ and $(|1\rangle_1, |1\rangle_2, |1\rangle_3)$ are acquired with a probability of 90% or more as the final results corresponding to the four initial states $(|0\rangle_1, |0\rangle_2, |0\rangle_3)$, $(|0\rangle_1, |1\rangle_2, |0\rangle_3)$, $(|1\rangle_1, |0\rangle_2, |0\rangle_3)$ and $(|1\rangle_1, |1\rangle_2, |0\rangle_3)$. This means that the quantum Toffoli gate operation, which has the property that when this operation is iterated an odd number of times, the state of the target bit (the quantum bit indicated by ion 3) is reversed only if the two control bits (the quantum bits indicated by ions 1 and 2) assume states of (1, 1), is correctly executed with a high probability for a long gate operation time of about 30 ms. 10 ms is set assuming information processing using a large number of quantum bits, and is set as a time for which quantum bits other than the above-mentioned ones are operated, or as a time for which each quantum Toffoli gate operation is performed while quantum bits are represented using only $|0\rangle$ and $|1\rangle$.

A description will be given of the case where the quantum Toffoli gate operation cannot correctly be executed if one of the two energy states set to the critical point is one of the two energy states ($|C\rangle$, $|D\rangle$) that resonate in the resonator mode.

When a magnetic field is applied, three ions 4, 5 and 6, in which all the transitions between $|C\rangle$ and $|D\rangle$ resonate in the resonator mode, are selected. Concerning these three ions, $|A'\rangle$, $|A\rangle$, $|B'\rangle$, $|B\rangle$, $|C'\rangle$, $|C\rangle$, $|D'\rangle$, $|D\rangle$, $|E'\rangle$, $|E\rangle$, $|F'\rangle$ and $|F\rangle$ will now be referred to as $|0'\rangle$, $|0\rangle$, $|1'\rangle$, $|1\rangle$, $|2'\rangle$, $|2\rangle$, $|3'\rangle$, $|3\rangle$, $|4'\rangle$, $|4\rangle$, $|5'\rangle$ and $|5\rangle$, respectively. Also in ions 4, 5 and 6, the transition energy between any two of the 12 energy states varies in a certain energy range, except for between any two of the energy states $|2'\rangle$, $|2\rangle$, $|3'\rangle$ and $|3\rangle$. In this case, ions having different transition frequencies are utilized, and resonant ions can be selected by adjusting the frequency of the light applied.

In the same manner as in the case of ions 1, 2 and 3, ions 4, 5 and 6 are set to initial states $(|1\rangle_4, |1\rangle_5, |0\rangle_6)$. Further, in the same manner as in the case of ions 1, 2 and 3, the sequence, which consists of three successive quantum Toffoli gate operations performed at intervals of 10 ms and reading of final results by light application and photon detection, is iterated a large number of times. In this case, $(|1\rangle_4, |1\rangle_5, |1\rangle_6)$ and $(|1\rangle_4, |1\rangle_5, |0\rangle_6)$ irregularly appear as the final results. This means that concerning ions 4, 5 and 6, the quantum Toffoli gate operation is not correctly performed.

In the case of ions 1, 2 and 3, the two energy states set to the critical point when a magnetic field is applied thereto are energy states ($|B\rangle$, $|C\rangle$) that are included in the energy states ($|A\rangle$, $|B\rangle$, $|C\rangle$) indicating quantum bits and do not include the two energy states ($|A\rangle$, $|D\rangle$) that resonate in the resonator mode. In contrast, in the case of ions 4, 5 and 6, one ($|C\rangle$) of the two energy states ($|B\rangle$, $|C\rangle$) set to the critical point when a magnetic field is applied thereto is included in the two energy states ($|C\rangle$, $|D\rangle$) that resonate in the resonator mode. The quantum information processing method and device of the first embodiment can confirm that when the two energy states, which are included in energy states indicating quantum bits and set to the critical point when a magnetic field is applied thereto, do not include an energy state that resonates in the resonator mode, the coherence time increased by the application of the magnetic field works effectively, and a series of quantum gate operations is performed normally.

It can be confirmed from the quantum information processing method and device of the first embodiment that a pair of energy states included in the energy states indicating quantum bits and not degenerated when no magnetic field is applied can effectively utilize the coherence time increased when a magnetic field of a particular direction and intensity is applied to rare-earth-dispersed crystal, and can normally perform a series of quantum gate operations.

Second Embodiment

Referring to FIG. 6, a quantum information processing method and device according to a second embodiment will be described.

The second embodiment is directed to the above-described case (2) where the coherence time between energy states that are degenerated when no magnetic field is applied is extended by the application of a magnetic field.

The quantum information processing device of the second embodiment shown in FIG. 6 is similar to that of the first embodiment, except for the following points:

In the second embodiment, the coils 406 and other coils are provided around crystal in the same manner as in the first embodiment shown in FIG. 4. However, in the second embodiment, the coils 406 and other coils apply a magnetic field of 30 G in a direction perpendicular to both the $C_2$-axis of the crystal and the polarization direction of the optical transition between $^3H_4$ and $^1D_2$. Although in the second embodiment, the direction of the magnetic field is designated, it is important in the second embodiment to apply a magnetic field, and the direction of the magnetic field is not so important as in the first embodiment.

The magnetic-field designation unit 402 can supply a current to the coils 406 and other coils, or interrupt the supply of the current.

Also in the second embodiment, the energy states of $Pr^{3+}$ ions released from the degenerated states by the applied magnetic field are utilized as in the case of FIG. 5. The second embodiment utilizes two ions in which all transitions between |B> and |D> (|B'> and |D'>) resonate in a common resonator mode when no magnetic field is applied.

In the second embodiment, |A'>, |A>, |B'>, |B>, |C'>, |C>, |D'>, |D>, |E'>, |E>, |F'> and |F> will be referred to as |1>, |0>, |2>, |3>, |4>, |5>, |6>, |7>, |8>, |9>, |10> and |11>, respectively. The transition energy between any two of the 12 energy states |0> to |11> of each ion varies in a certain energy range, except for between any two of the energy states |2>, |3>, |6> and |7>. In this case, ions having different transition frequencies are utilized, and resonant ions can be selected by adjusting the frequency of the light applied.

Figure 7:
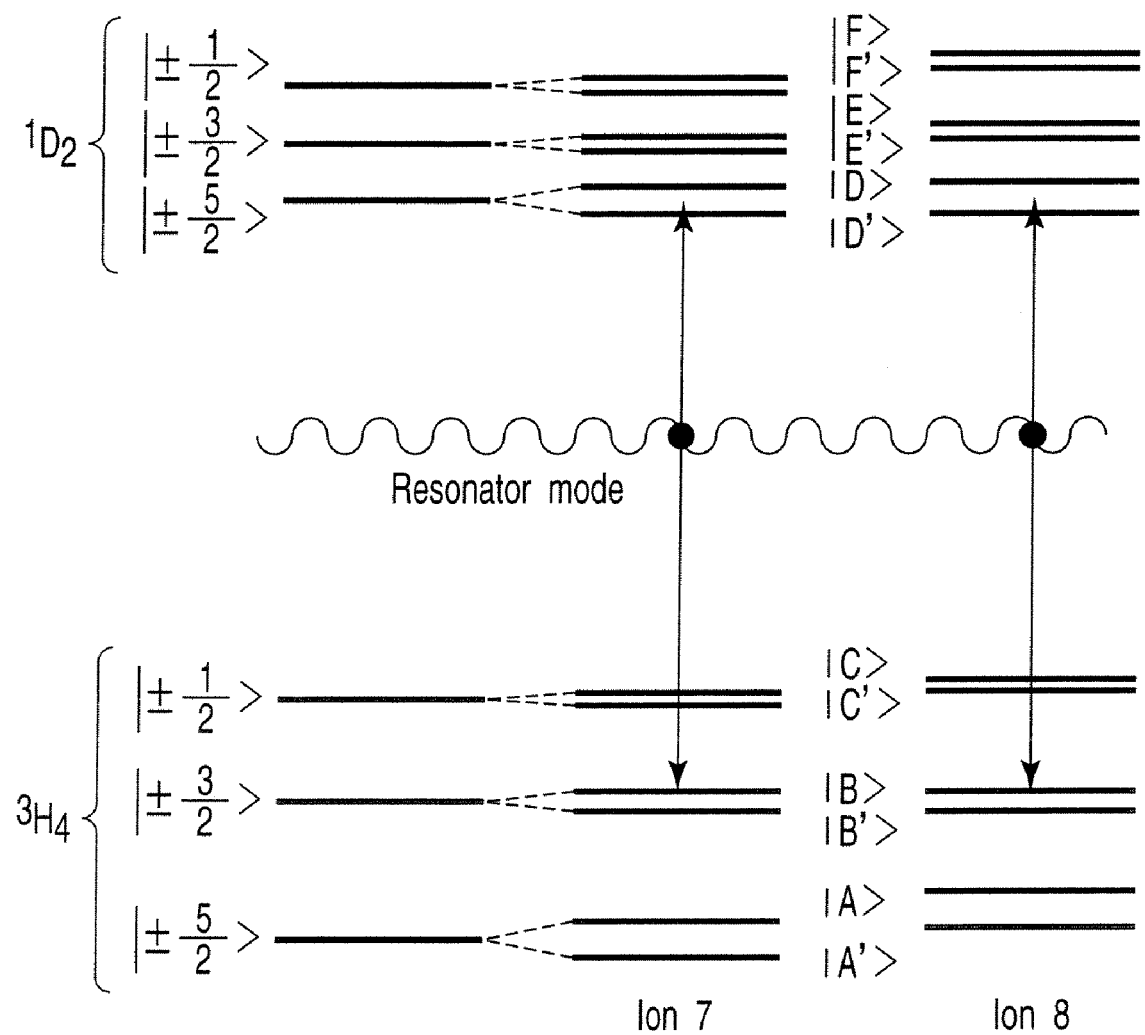
FIG. 7 is a view illustrating the energy states of two $Pr^{3+}$ ions employed in the second embodiment.

Referring to FIG. 7, the gate operation performed in the second embodiment will be described. FIG. 7 shows the energy states of two ions 7 and 8 utilized in the second embodiment.

Five light beams are sequentially applied to ion 7 and ion 8, and each of five light beams simultaneously is applied the ion 7 and ion 8, thereby initializing the states of the ions to $|0>_7$ and $|1>_8$, respectively. As the five light beams simultaneously applied to ions 7 and 8, light beams that resonate with the transition between |1> and |6>, between |2> and |8>, between |3> and |9>, between |4> and |10> and between |5> and |11> are used.

Subsequently, adiabatic passage is performed on ions 7 and 8 three times, using two Gaussian pulse light beams with a pulse width of 10 μs, thereby realizing quantum state shifts of $|0>_7 \to |2>_7$, $|0>_8 \to |2>_8$ and $|1>_8 \to |3>_8$.

After that, the application of the magnetic field is interrupted, and adiabatic passage is performed on ions 7 and 8, using Gaussian pulse light with a pulse width of 10 μs that resonates with the transition between |1> and |6> (|0> and |7>), thereby exchanging the quantum states of ions 7 and 8 for each other.

Thereafter, the application of the same magnetic field as before is started, and the quantum state of ion 8 is exchanged between |1> and |0> by applying light, and adiabatic passage is again performed on ions 7 and 8, using light that resonates with the transition between |1> and |6> (|0> and |7>), thereby exchanging the quantum states of ions 7 and 8 for each other. Further, adiabatic passage is performed on ions 7 and 8 three times, using two light beams, thereby returning the quantum bits to the original energy states |0> and |1>.

If the quantum bits are |0> and |1>, a series of gate operations mentioned above is regarded as a control NOT gate operation for changing the quantum states as follows:

$(|0>_7, |0>_8) \to (|0>_7, |0>_8)$ $(|0>_7, |1>_8) \to (|0>_7, |1>_8)$ $(|1>_7, |0>_8) \to (|1>_7, |1>_8)$ $(|1>_7, |1>_8) \to (|1>_7, |0>_8)$

If ions 7 and 8 are initialized to $(|0>_7, |0>_8)$, the above-described control NOT gate operation is iterated seven times, and the final results are read by light application and photon detection, $(|0>_7, |0>_8)$ are acquired as the final results. Similarly, if ions 7 and 8 are initialized to $(|0>_7, |1>_8)$, $(|1>_7, |0>_8)$ and $(|1>_7, |1>_8)$, and the above-described-7-times control NOT gate operation is iterated three times for the respective initialization cases, $(|0>_7, |1>_8)$, $(|1>_7, |1>_8)$ and $(|1>_7, |0>_8)$ are acquired as the final results. If the sequence consisting of seven successive control NOT gate operations is iterated a large number of times, and the final results are read, $(|0>_7, |0>_8)$, $(|0>_7, |1>_8)$, $(|1>_7, |1>_8)$ and $(|1>_7, |0>_8)$ are acquired with a probability of 90% or more as the final results corresponding to the four initial states $(|0>_7, |0>_8)$, $(|0>_7, |1>_8)$, $(|1>_7, |0>_8)$ and $(|1>_7, |1>_8)$. This means that the control NOT gate operation, which has the property that when this operation is iterated an odd number of times, the state of the target bit (the quantum bit indicated by ion 8) is reversed only if the control bit (indicated by ion 7) assumes a state of |1>, is correctly executed with a high probability as large as seven times for a long time of about 5 ms.

In the above-described quantum information processing devices and methods of the embodiments, where energy states indicating quantum bits are degenerated when no magnetic field is applied, if a magnetic field is always applied, and the application of the magnetic field is interrupted only if two-qbit-gate adiabatic passage is performed, the coherence time increased by the application of the magnetic field can be effectively utilized, and a series of quantum gate operations can be normally performed.

The above-described embodiments can also extend the time of each gate operation. Accordingly, in quantum information processing in which quantum bits are discriminated from each other by their frequency regions (i.e., their transition energy), the frequency (energy) resolution can be enhanced, with the result that the number of quantum bits can be increased.

In addition, the above-described embodiments can provide methods for use in a quantum information processing device that uses, as quantum bits, physical systems magnetically influencing each other, and uses a resonator mode. These methods can actually utilize, for quantum information processing, the coherence time of quantum bits significantly increased by the application of a magnetic field.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A quantum information processing device comprising:
a resonator incorporating a material containing a plurality of physical systems, each of the physical systems having at least four energy states, transition between two energy states of the at least four energy states, and transition energy between at least two energy states of the at least four energy states, the at least four energy states being non-degenerate when a magnetic field fails to be applied to the physical systems, the transition resonating in resonator mode that is in common between the physical systems, each of the at least four energy states representing a quantum bit, the transition energy being shifted when the magnetic field is applied to the physical systems; and a magnetic-field application unit configured to apply a magnetic field having a direction and an intensity to the material, to eliminate a linear transition energy shift between two energy states included in the physical systems, each of the two energy states included in the physical systems being with excluding the two energy states resonating in the resonator mode.

2. The device according to claim 1, wherein each of the physical systems includes a rare earth ion contained in oxide crystal.

3. The device according to claim 1, further comprising a cryostat which holds interior at a constant temperature, and contains the resonator, the material and the magnetic-field application unit.

4. The device according to claim 1, wherein the magnetic-field application unit includes at least two pairs of electromagnets.

5. The device according to claim 1, wherein the magnetic-field application unit includes at least one pair of electromagnets and a rotary unit configured to rotate the material about three axes which fail to be parallel to each other.

6. A quantum information processing device comprising:
a resonator incorporating a material containing a plurality of physical systems, each of the physical systems having a plurality of energy states and transition between two energy states of the plurality of energy states, the transition resonating in the resonator mode that is in common between the physical systems, each of energy states that are degenerate and are included in the plurality of energy states representing a quantum bit;

a magnetic-field application unit configured to apply a magnetic field to the physical systems;

a light source unit configured to output a laser beam;

a separation unit configured to separate the laser beam into a plurality of laser beams;

a laser control unit configured to control phase, intensity and frequency of each of the laser beams, the laser control unit converting the laser beams into pulse laser beams;

an emission unit configured to emit the controlled laser beams to the physical systems; and a magnetic-field control unit configured to control application of the magnetic field, the magnetic-field control unit causing the magnetic-field application unit to interrupt the application of the magnetic field only when adiabatic passage for a two-qbit (i.e., quantum bit) gate operation is performed between two of the physical systems utilizing the resonator mode.

7. The device according to claim 6, wherein each of the physical systems includes a rare earth ion contained in oxide crystal.

8. The device according to claim 6, further comprising a cryostat which holds interior at a constant temperature, and contains the resonator, the material and the magnetic-field application unit.

9. The device according to claim 6, wherein the magnetic-field application unit includes at least two pairs of electromagnets.

10. The device according to claim 6, wherein the magnetic-field application unit includes at least one pair of electromagnets and a rotary unit configured to rotate the material about three axes which fail to be parallel to each other.

11. A quantum information processing method comprising:
preparing a resonator incorporating a material containing a plurality of physical systems, each of the physical systems having at least four energy states, transition between two energy states of the at least four energy states, and transition energy between at least two energy states of the at least four energy states, the at least four energy states being non-degenerate when a magnetic field fails to be applied to the physical systems, the transition resonating in resonator mode that is in common between the physical systems, each of the at least energy states representing a quantum bit, the transition energy being shifted when the magnetic field is applied to the physical systems; and applying a magnetic field having a direction and an intensity to the material, to eliminate a linear transition energy shift between two energy states included in the physical systems, each of the two energy states included in the physical systems being with excluding the two energy states resonating in the resonator mode.

12. The method according to claim 11, wherein each of the physical systems includes a rare earth ion contained in oxide crystal.

13. The method according to claim 11, further comprising preparing a cryostat which holds interior at a constant temperature, and contains the resonator and the material.

14. A quantum information processing method comprising:
preparing a resonator incorporating a material containing a plurality of physical systems, each of the physical systems having a plurality of energy states and transition between two energy states of the plurality of energy states, the transition resonating in the resonator mode that is in common between the physical systems, each of energy states that are degenerate and are included in the plurality of energy states representing a quantum bit;

applying a magnetic field to the physical systems;

outputting a laser beam;

separating the laser beam into a plurality of laser beams;

controlling phase, intensity and frequency of each of the laser beams, converting the laser beams into pulse laser beams;

emitting the controlled laser beams to the physical systems;

controlling application of the magnetic field; and interrupting the application of the magnetic field only when adiabatic passage for a two-qbit (i.e., quantum bit) gate operation is performed between two of the physical systems utilizing the resonator mode.

15. The method according to claim 14, wherein each of the physical systems includes a rare earth ion contained in oxide crystal.

16. The method according to claim 14, further comprising preparing a cryostat which holds interior at a constant temperature, and contains the resonator and the material.

* * * * *